Aug. 2, 1966     J. C. KARCHER     3,264,084
PRODUCTION OF A SOIL NUTRIENT IN A MINIMAL LIQUID ENVIRONMENT
Filed Feb. 5, 1964
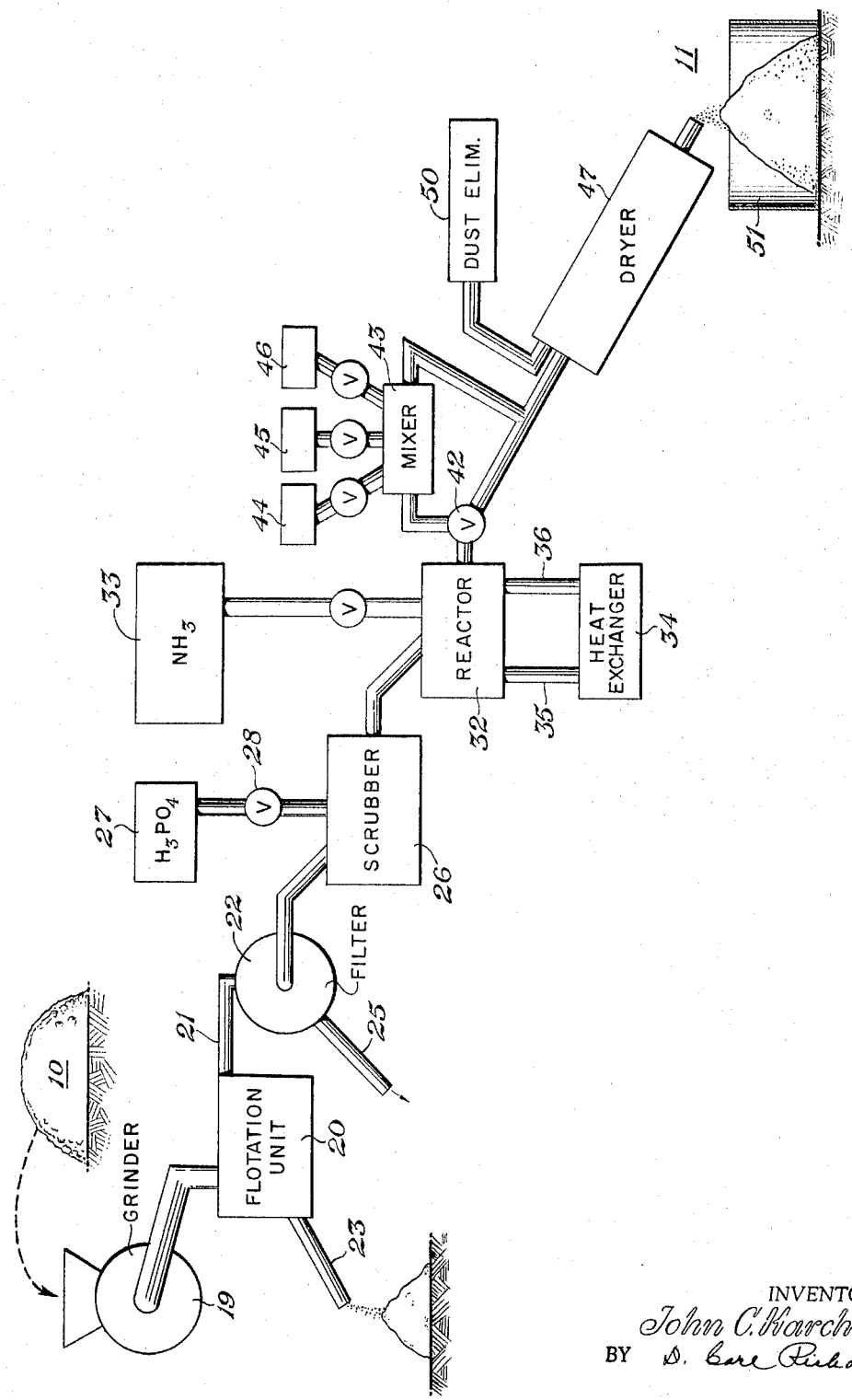
INVENTOR.
John C. Karcher
BY
Attorney //  // 
United States Patent Office 3,264,084
Patented August 2, 1966

3,264,084
PRODUCTION OF A SOIL NUTRIENT IN A MINIMAL LIQUID ENVIRONMENT
John C. Karcher, Dallas, Tex., assignor to Concho Petroleum Company, Dallas, Tex., a corporation of Delaware
Filed Feb. 5, 1964, Ser. No. 342,678
10 Claims. (Cl. 71—24)

This application is a continuation-in-part of application Serial No. 257,215, filed February 8, 1963, now abandoned.

This invention relates to the production of a soil nutrient from lignite-leonardite ore and, more particularly, to a method in which the total expenditure of reactants and energy is maintained at a minimum level. In a more specific aspect, the invention relates to the control of a relatively dry mixture in a reaction which includes scrubbing and ammoniation of leonardite.

Leonardite is a coal-like substance similar in structure and composition to lignite. It has been considered to be a precursor to lignite. It is believed to be present in existing deposits as a derivative, by oxidation, from lignite. The process of natural oxidation is due to exposure to atmospheric oxygen and ground water. Oxidation occurs primarily at the exposed faces and at shallow depths in ore overlying or graded into harder and more compact lignite beds.

Leonardite has been found to be a source of base material for a soil nutrient including humic and fulvic acid as fractions thereof. The significant elemental difference between leonardite and lignite is its oxygen content. Leonardite has an oxygen content of the order of 28 to 29 percent. Lignite has a much lower oxygen content of 19 to 20 percent. The higher oxygen content of leonardite is due to the larger number of carboxylic acid groups. Thus, leonardite is far more soluble in alkali than lignite. Spectral studies have indicated that leonardite is comprised of a high proportion of mixed salts and humic and fulvic acids.

Such acids in the form of ammonium humates or ammonium fulvates are soluble and are of characteristics such as to be highly nutritive to plants. They thus may form fertilizers of outstanding quality.

Several different approaches have been undertaken toward the extraction of such acids from such ores. For example, in Patent 3,111,404 a liquid system is employed for extracting humic acid and forming humates. Further, a report in Chemical and Engineering News, January 21, 1963, page 82, discloses studies made by the United States Bureau of Mines in which a liquid system is employed.

Fertilizers are widely used in a dry pellet or powder form. In order to produce the same on a commercial scale, it has been found possible, as well as highly desirable, to minimize the liquids employed in the process to provide conditions for maximum yield while minimizing the expenditure in reactants.

It is an object of the present invention to produce a soil nutrient from lignite-leonardite ores.

It is a further object of the invention to minimize the energy necessary to produce ammonium humate or ammonium fulvate in dry form while enhancing the total yield thereof in a process involving the addition to the raw material of liquid reactants.

More particularly, in accordance with one aspect of the invention, ammonium phenols are produced from lignite-leonardite ores ground to a relatively fine particle size. The relatively dry ground ore is first scrubbed with phosphoric acid, and then ammonia is added. Thereafter, fertilizer additives may be introduced. Preferably anhydrous ammonia and dry additives are employed to reduce the relative proportion of liquid in the mixture. The mixture is pelletized and substantially dried to a crystalline form including ammonium humates and ammonium fulvates either alone or mixed with additives to form a balanced fertilizer, depending upon the amount and type of additives.

For a more complete understanding of the present invention and for further objects and advantages thereof, reference may now be had to the following description taken in conjunction with the accompanying drawing in which:

The drawing is a block diagram of the reaction system of the present invention in which is illustrated one form of a reaction system for utilization of lignite-leonardite ores such as stockpiled in a pile 10 for the production of a soil nutrient delivered to an output station 11. The system includes a grinder 19 where the ore is reduced to a particle size preferably of 80 to 200 mesh size.

Ground ore is conveyed from the grinder 19 to a flotation cell 20. It has been found that substantial deposits of leonardite are almost free from organic materials that are not alkali soluble, and that in general the inorganic constituents are such that may be separated from the leonardite by flotation. In such deposits the lignite has been substantially completely converted to leonardite, centrifuge separations having shown a concentration of sand and clay particles of the order of about 20 percent. Thus, ground ore introduced to unit 20 is separated so that the leonardite is floated and delivered by way of channel 21 to a thickener 22. The heavier constituents of the ore are delivered to a waste pile by way of conveyor 23.

The flotation unit 20 may be of the type generally well known in the art such as the example disclosed in the "Mining Engineer's Handbook" by Peele, third edition, volume 2, John Wiley & Sons, 1941, in section 15 beginning at page 31–12.

The thickener 22 receiving materials from the flotation unit 20 serves to remove excess moisture therefrom such that the materials delivered from the thickener by way of a conventional conveyor have a water content of about 40 to 60 percent of the dry weight of the solids, if dry additives are to be introduced later in the process. The water content will be reduced by action of thickener 22 to about 20 to 40 percent, if no dry additives are to be introduced. Such excess liquids are removed and delivered to a tailing pile by way of channel 25. Thickener 22 may be a filter or classifier of the type well known in the art as illustrated by Peele (above), section 13, page 35–23.

The mixture is then conveyed to a scrubber 26 which includes an agitator for thorough blending of the leonardite with phosphoric acid delivered from a supply 27 by way of valve 28.

The reaction in the scrubber 26 is carried out with the material maintained in a relatively dry state, but with sufficient moisture to obtain complete chemical reaction, and for thorough mixing and convenient handling. The moisture content of the material in the scrubber preferably is maintained as stated above. The action of the phosphoric acid on the leonardite ore is to convert the ore substantially completely to phenols including as principal constituents humic acid and fulvic acid.

The product is then delivered by a conventional conveyor to a second mixing unit 32. Anhydrous ammonia is added to the mixture introduced into unit 32 from a receptacle 33 in sufficient quantity to react with the humic and fulvic acids in the product emerging from the unit 26 to form ammonium humates and fulvates.

The reaction between anhydrous ammonia and the mixture is an exothermic reaction. The heat exchange unit 34, coupled by way of lines 35 and 36 to a suitable jacket on the mixer 32, maintains the temperature therein at an elevated, but controlled, temperature. Preferably the temperature should not exceed 90° C. The ammonia added into the mixture in unit 32 is in such amounts as to react with all of the acid in the mixture for forming a soluble soil nutrient product. It has been found that satisfactory amounts of ammonia are in the range of about one part ammonia to six parts total acid present, including humic acid, fulvic acid, and any unexpended phosphoric acid.

The mixture from the unit 32 may then be conveyed to a mixer 43. To this mixture there may be added dry fertilizer constituents which will lower the total proportion of liquids to solids. The additives may be supplied from receptacles 44, 45, and 46. The additives may be one or more of potassium sulphate, ammonium phosphate, ammonium nitrate, urea or the like. Pelletizing will take place in reactor 32 or mixer 43 if the moisture content is of the order of about 28 percent. The material either as it is issuing from mixer 43 or as it issues from the reactor 32 is conveyed to a dryer 47 to adjust the moisture content to the level of about 8 to 12 percent. The material issuing from the dryer 47 is in pellet form, and preferably of a size larger than 14 screen mesh and smaller than 6 screen mesh.

The dryer 47 may be of rotary kiln or other conventional type, which reduces the moisture content of the pellets. The product in dry form then issues from the dryer 47 to a storage receptacle 51 at output station 11.

The present invention involves treatment to remove non-nutrient materials in the ore in the flotation unit 20. This operation takes place under conditions in which the nutrient materials are maintained in the same insoluble state as they were in the original ore body. The nutrient materials conveyed from the flotation unit 20 to the thickener 22 are treated to reduce the moisture content to such a level that removal of moisture from the materials of the subsequent treatments other than by evaporation will not be required. By this means, the entire nutrient content of the original ore is retained. The subsequent operations on the ore are such that a minimum expenditure of energy is required to complete the process. Where the product from the dryer 47 is to comprise primarily ammonium humate and fulvate without other nutrient additives as from sources 44–46, the moisture level of material introduced into the scrubber 26 will be such that upon delivery to the reactor 32 and the addition of the ammonia from source 33, there will be a tendency to form pellets as the ammoniation takes place. As above noted, this moisture level is in the range from about 20 to 40 percent of the dry weight of the solids.

If additional nutrients are to be added, the output from unit 32 is directed through valve 42 to the mixer 43. Additional materials are delivered from any one or all sources 44, 45, 46, and mixed thoroughly. In such case the moisture content of the material issuing from thickener 22 will be higher, from about 40 to 60 percent of the dry weight of the solids, depending upon the amounts of dry additives introduced to mixer 43.

A dust eliminator 50 is employed in conjunction with the dryer 47. As is well known in the art, a spray is directed onto the material in the dryer 47 to control the dust. Potassium hydroxide, or ligno sulfonates are representative of the materials which may be used for dust control.

In the present case, the moisture content is controlled by removing excess moisture ahead of the scrubber 26 while the nutrient constituents are still insoluble. This minimizes the loss of nutrient values. At the same time, the energy necessary to carry out the entire process is maintained at a minimum.

From the foregoing it will be seen that there is provided for conversion of lignite-leonardite constituents of an ore to a form in which humic and fulvic acids are present in substantial quantities. The system is then so controlled as to reduce the metallic salts in the ore to acids and to place them in soluble form. This is accomplished while maintaining the system in a relatively dry condition. A substantial increase in yield and decrease in manufacturing cost is achieved while maintaining at a minimum the reacting constituents and energy required.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of producing a fertilizer from leonardite ore which comprises:
   (a) grinding the ore substantially to reduce particle size,
   (b) adjusting the moisture content of the ore of reduced particle size to a relatively dry state of the order of about 20 to 60 percent of the dry weight of the solids,
   (c) scrubbing the ore with orthophosphoric acid to produce acids including humic acid and fulvic acid while maintaining said relatively dry state, and
   (d) reacting said acids with ammonia in said relatively dry state to form ammonium humate and ammonium fulvate while agglomerating the same into pellets.

2. The method set forth in claim 1 in which the moisture content is reduced to within a range of about 40 to 60 percent and to which dry additives are introduced following ammoniation thereof as to include dry additives in said pellets.

3. The method set forth in claim 1 in which scrubbing is maintained at a temperature not to exceed about 90° C.

4. The method of claim 1 in which ammoniation is carried out with about one part of ammonia to six parts total acid including humic acid, fulvic acid and unexpended phosphoric acid.

5. The method of producing a fertilizer from lignite-leonardite ore which comprises:
   (a) grinding the ore substantially to reduce particle size,
   (b) separating by flotation in a liquid environment non-leonardite constituents of said ore from the leonardite,
   (c) reducing the moisture content of the said constituents to a relatively dry state of the order of 20 to 60 percent of the dry weight of the solids,
   (d) scrubbing the low moisture content leonardite with phosphoric acid to produce acids including humic acid and fulvic acid while maintaining said relatively dry state, and
   (e) reacting said acids with ammonia in said dry state to form ammonium humate and ammonium fulvate while agglomerating the same into pellets.

6. The method set forth in claim 5 in which the separation is by flotation of the leonardite followed by filtration before scrubbing.

7. The method set forth in claim 5 in which the moisture content is reduced to within the range of about 20 to 40 percent of the dry weight of the solids.

8. A system for producing a fertilizer from leonardite ore which comprises:
   (a) a grinder for reducing the particle size of the ore for subsequent reaction of constituents therein,
   (b) a separator flow-connected to said grinder having a liquid body therein to remove non-leonardite constituents,
   (c) a filter for reducing the moisture content of the leonardite constituents issuing from the separator to the relatively dry state of about 20 to 60 percent of the dry weight of the solids,
   (d) a scrubber for receiving the solids from said filter and having a source of orthophosphoric acid for treatment of said solids while maintaining said relatively dry state,
   (e) a reactor for receiving the output from said scrubber and having a source of anhydrous ammonia and a heat exchanger for ammoniating said solids in said dry state while maintaining the temperature at a level not to exceed 90° C., and (f) means for drying the ammoniated solids.

9. The combination set forth in claim 8 wherein a mixer is connected to the output of said reactor and has a source of dry nutrient additives and means for mixing and pelletizing materials therein.

10. The method of producing a fertilizer from lignite-leonardite ore which comprises:

(a) grinding the ore to a substantially reduced particle size of the order of about 80 mesh, (b) adjusting the moisture content of the ore of reduced particle size to the relatively dry state of about 20% to 60% of the dry weight of the solids, (c) reacting the ore with orthophosphoric acid at substantially said dry state to produce acids including humic acid and fulvic acid, (d) reacting said acids with ammonia substantially at said dry state to form ammonium humate and ammonium fulvate, and (e) agglomerating said ammonium humate and ammonium fulvate into pellets.

References Cited by the Examiner

UNITED STATES PATENTS

| 2,093,047 | 9/1937 | Hudig et al. | 71—24 |
| 2,985,643 | 5/1961 | Boomer et al. | 71—23 |
| 2,992,093 | 7/1961 | Burdick | 71—24 |
| 3,111,404 | 11/1963 | Karcher et al. | 71—24 |

DONALL H. SYLVESTER, *Primary Examiner.*

ANTHONY SCIAMANNA, J. H. NEWSOME,
*Assistant Examiners.*